United States Patent
Alcazar

(10) Patent No.: US 8,339,471 B2
(45) Date of Patent: Dec. 25, 2012

(54) AUTO WHITE BALANCE ALGORITHM USING RGB PRODUCT MEASURE

(75) Inventor: Jose Antonio Mendez Alcazar, San Jose, CA (US)

(73) Assignee: DigitalOptics Corporation Europe Limited, Galway (IE)

( * ) Notice: Subject to any disclaimer, the term of this patent is extended or adjusted under 35 U.S.C. 154(b) by 435 days.

(21) Appl. No.: 12/651,190

(22) Filed: Dec. 31, 2009

(65) Prior Publication Data

US 2011/0157410 A1 Jun. 30, 2011

(51) Int. Cl.
*H04N 9/73* (2006.01)

(52) U.S. Cl. .................. 348/223.1; 348/222.1

(58) Field of Classification Search ............... 348/222.1, 348/223.1
See application file for complete search history.

(56) References Cited

U.S. PATENT DOCUMENTS

| | | | |
|---|---|---|---|
| 7,184,080 B2 * | 2/2007 | Kehtarnavaz et al. | ..... 348/223.1 |
| 7,352,394 B1 | 4/2008 | DeLuca et al. | |
| 7,436,998 B2 | 10/2008 | Steinberg et al. | |
| 7,469,071 B2 | 12/2008 | Drimbarean et al. | |
| 7,474,341 B2 | 1/2009 | DeLuca et al. | |
| 7,536,036 B2 | 5/2009 | Steinberg et al. | |
| 7,587,085 B2 | 9/2009 | Steinberg et al. | |
| 7,620,218 B2 | 11/2009 | Steinberg et al. | |
| 7,630,006 B2 | 12/2009 | DeLuca et al. | |
| 7,804,531 B2 | 9/2010 | DeLuca et al. | |
| 7,847,839 B2 | 12/2010 | DeLuca et al. | |
| 7,847,840 B2 | 12/2010 | DeLuca et al. | |
| 7,852,384 B2 | 12/2010 | DeLuca et al. | |
| 7,916,897 B2 | 3/2011 | Corcoran et al. | |
| 7,953,250 B2 | 5/2011 | Steinberg et al. | |
| 7,953,251 B1 | 5/2011 | Steinberg et al. | |
| 7,953,287 B2 | 5/2011 | Drimbarean et al. | |
| 8,036,460 B2 | 10/2011 | Nanu et al. | |
| 8,055,029 B2 | 11/2011 | Petrescu et al. | |
| 8,135,184 B2 | 3/2012 | Steinberg et al. | |
| 8,155,397 B2 | 4/2012 | Bigioi et al. | |
| 2007/0041064 A1 | 2/2007 | Subbotin | |
| 2008/0143851 A1* | 6/2008 | Shi | .......................... 348/223.1 |
| 2008/0309790 A1* | 12/2008 | Nishiwaki et al. | ......... 348/223.1 |

(Continued)

FOREIGN PATENT DOCUMENTS

WO 2011/082366 A1 7/2011

OTHER PUBLICATIONS

"Color balance" from Wikipedia, the free encyclopedia dated Jan. 2011 downloaded from the Internet on Feb. 2, 2011 < http://en.wikipedia.org/wiki/Color_balance > (6 pages).

(Continued)

*Primary Examiner* — Gevell Selby
(74) *Attorney, Agent, or Firm* — Andrew V. Smith

(57) ABSTRACT

A method and device is provided for adjusting the white balance of a digital image by adjusting the values assigned to the red, green, and blue subpixels of a pixel in the image. The adjustment to the subpixels is determined by identifying pixels in the image that have an RGB product greater than a threshold value, wherein the threshold value is based at least in part on an average of the RGB products of each pixel in the image and a variance between the RGB products of the pixels and the average of the RGB products.

25 Claims, 4 Drawing Sheets

U.S. PATENT DOCUMENTS

| | | |
|---|---|---|
| 2009/0059025 A1 | 3/2009 | Tsujino et al. |
| 2009/0097745 A1* | 4/2009 | Kim et al. .................. 348/223.1 |
| 2009/0147099 A1* | 6/2009 | Kim et al. .................. 348/223.1 |
| 2009/0263022 A1 | 10/2009 | Petrescu et al. |
| 2009/0303342 A1 | 12/2009 | Corcoran et al. |
| 2011/0026780 A1 | 2/2011 | Corcoran et al. |
| 2011/0058071 A1 | 3/2011 | Bigioi et al. |
| 2011/0069186 A1 | 3/2011 | DeLuca et al. |
| 2011/0074975 A1 | 3/2011 | Deluca et al. |
| 2011/0102643 A1 | 5/2011 | Nanu et al. |
| 2011/0134271 A1 | 6/2011 | Bigioi et al. |
| 2011/0205381 A1 | 8/2011 | Vranceanu et al. |
| 2011/0221936 A1 | 9/2011 | Bigioi et al. |
| 2012/0008002 A1 | 1/2012 | Bigioi et al. |
| 2012/0014600 A1 | 1/2012 | Nanu et al. |
| 2012/0038788 A1 | 2/2012 | DeLuca et al. |
| 2012/0069198 A1 | 3/2012 | Bigioi et al. |
| 2012/0069222 A1 | 3/2012 | Steinberg et al. |
| 2012/0070087 A1 | 3/2012 | Petrescu et al. |

OTHER PUBLICATIONS

International Searching Authority, "International Search Report with Written Opinion", Received in PCT Application No. PCT/US10/62605, Applicant: Tessera Technologies, dated Feb. 24, 2011 (7 pages).

Current Claims of PCT Application No. PCT/US10/62605, Applicant: Tessera Technologies, dated Feb. 2011 (3 pages).

PCT Notification of Transmittal of Copies of International Preliminary Report on Patentability, Chapter I of the Patent Cooperation Treaty, International Preliminary Report on Patentability, for PCT Application No. PCT/US2010/062605, report dated Jul. 4, 2012, 6 pages.

* cited by examiner

|  | Column 1 | | | Column 2 | | |
|---|---|---|---|---|---|---|
| Row 1 | Red 101r | Green 101g | Blue 101b | Red | Green | Blue |
| Row 2 | Red | Green | Blue | Red | Green | Blue |

FIG. 1

AUTO WHITE BALANCE ALGORITHM USING RGB PRODUCT MEASURE

FIELD OF THE INVENTION

The present invention relates generally to digital image processing, and more particularly to a system and method for correcting the white balance in a digital image.

BACKGROUND

Various types of light, present when a digital image is captured, can cause an object in the captured image to have a hue that is not present when the object is viewed directly. For example, various types of artificial light can cause objects in captured images to have an orange hue, while natural light under certain circumstances can cause objects to have a blue hue. This hue is most noticeable on objects within an image that a viewer knows are white and expects to see as white.

To correct this type of image distortion, many sophisticated algorithms are applied to digital images to change pixel values for acquired image data into pixel values that will not show the distortion. This process of changing the values for acquired image data to make portions of an image expected to be white appear white is frequently referred to as adjusting the white balance of the image. White balance algorithms currently known in the art tend to be computationally expensive, and thus unsuitable for being implemented in hardware with real time logic and unsuitable for being implemented on smaller, mobile devices that have limited memory and limited processing power. Many white balance algorithms currently known in the art also require users to supply values for various settings in order for the algorithm to be executed, which undesirably increases a user's involvement in the picture taking process.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is an illustration of a pixel grid of a display device;

DETAILED DESCRIPTION

Figure 2:
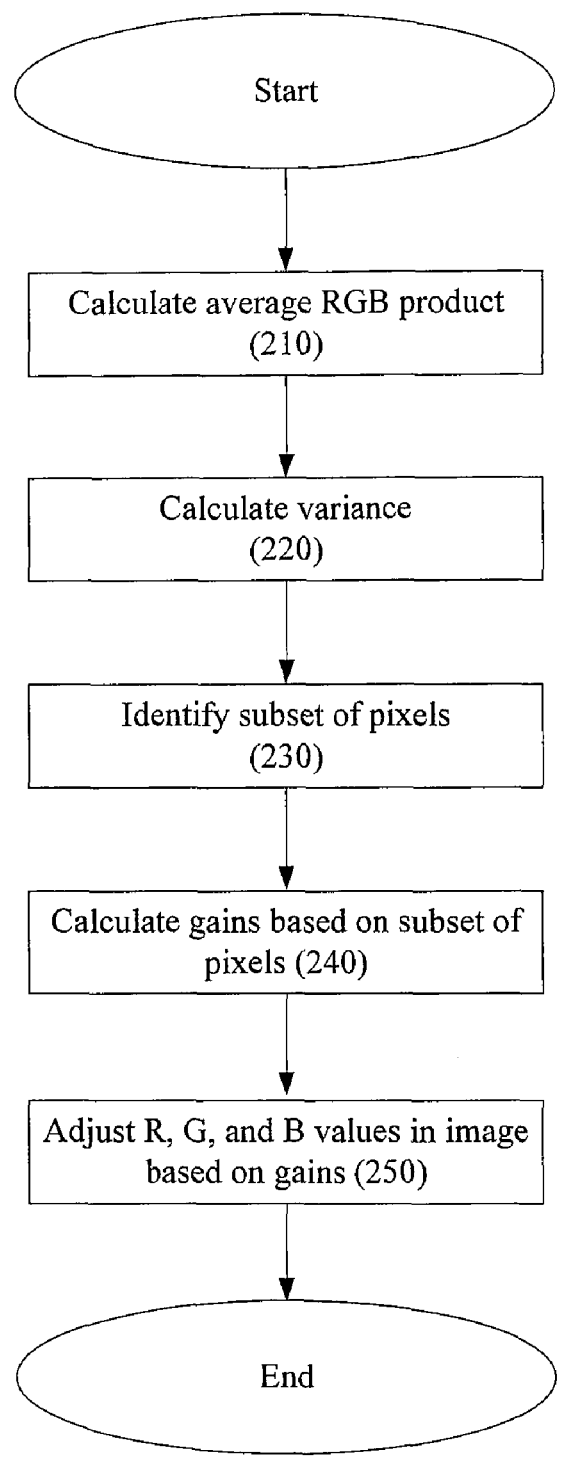
FIG. 2 is a flowchart of a process for adjusting the white balance in an image.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for performing white balance by adjusting the values assigned to the red, green, and blue subpixels of a pixel in order to cause color neutral areas of a picture to be rendered color neutral. Each pixel in a pixel array has an RGB product equal to the pixel's red value (R) multiplied by the pixel's green value (G) multiplied by the pixel's blue value (B). During the process of image capture, a first value corresponding to an average of the RGB products of each pixel in an image can be calculated and stored. A second value, corresponding to a variance between the RGB products of the pixels and the first value, can be calculated and stored. A subset of pixels with RGB products greater than the first value plus the second value can be identified. For the subset of pixels, the average values of R, G, and B for the pixels in the subset can be determined. Based on the determined averages of R, G, and B, gains can be determined that make the average values of R, G, and B for the subset of pixels equal. Based on the determined gains, the R, G, and B values for all pixels, or a subset of pixels, in the captured imaged can be adjusted.

Pixels and Subpixels

Typically, a digital image file includes a set of data values for a 2-dimensional grid of pixels. The pixel grid comprises rows of pixels that run horizontally and columns of pixels that run vertically, and each pixel in the pixel grid is identifiable by the row and column that contain that pixel. For example, an 800×600 image would have 800 columns of pixels and 600 rows of pixels for a total of 480,000 pixels. Column 155 and row 235, for example, would uniquely identify a single pixel of the 480,000 pixels in the grid.

Each pixel in the grid can comprise a plurality of subpixels. FIG. 1 shows an example of a 2-by-2 grid of pixels, with each pixel comprising three subpixels. For example, the pixel of row 1, column 1 comprises a red subpixel 101r, a green subpixel 101g, and a blue subpixel 101b. The value of each subpixel indicates the intensity at which an element that corresponds to the subpixel is illuminated within the image. The number of values that can be assigned to a subpixel depends on the bit depth of the subpixel. For example, in a 24-bit display, each of the three subpixels has a bit depth of 8, and can thus support $2^8$ (i.e. 256) different values, ranging from 0 to 255. As each of the three subpixels can support 256 different values, the pixel can produce 16,777,216 (256*256*256) different colors. Image sensors on image acquisition devices such as cameras capture the image data used to illuminate the pixel grid. Although the present disclosure gives examples related to 24-bit image data, 42-bit image sensors and image sensors with alternative bit depths are also known in the art and are compatible with the techniques described herein.

A pixel appears as a neutral color, such as those on the gray scale, when the values for the red element, green element, and blue element are equal in value to one another. For example, the truest white a display is capable of producing occurs when all three subpixels are assigned values of 255; a true gray color is produced when all three subpixels are assigned values of 128; and black is produced when all three subpixels are assigned values of 0. Assigning high values (e.g. over 220) to each of the subpixels of a pixel will cause the pixel to produce a color that is near white. When the values of the subpixels are not equal, the color produced by the pixel will have a hue. For example, if the value of the red subpixel is 240, the value of the green subpixel is 240, and the value of the blue subpixel is 248, then the color produced by the pixel will have a blue hue.

Identifying Near-White Pixels

In digital image acquisition, variations in light temperature can cause an image sensor to detect white and near-white colors as having such a hue. Techniques are described hereafter for identifying portions of images containing an undesirable hue and adjusting the values of the subpixels so that the display renders the near white portions of the image as color neutral and without the undesirable hue.

Unlike prior art methods of adjusting an image's white balance that use luminance values or RGB sums to identify near-white pixels, the techniques described hereafter use a product of the R, G, and B values ($RGB_{product}$) for individual pixels in an image to identify areas within the image that are expected to be color neutral.

FIG. 2 shows a flowchart of a method implementing techniques described herein. During the process of image capture, an average RGB product ($RGB_{avg\_prod}$) can be calculated based on a first frame (block 210). Each pixel in the frame will have an $RGB_{product}$, and the value of $RGB_{avg\_prod}$ is the average of the $RGB_{product}$ value for each pixel in the frame. A variance can be calculated using $RGB_{product}$ values for pixels of a second frame and the $RGB_{avg\_prod}$ value obtained from the first frame (block 220). The variance value is the average variation between the $RGB_{product}$ values of each pixel and the $RGB_{avg\_prod}$. An image with many contrasting colors will have a high variance while an image with one dominant color will have a low variance. For example, an image of a flower garden will typically have a higher variance than an image dominated by a single color wall.

From a third frame, a set of "near-white" pixels are identified (block 230) based on the variance determined at block 220. In one embodiment, the near-white pixels are the pixels in the image that satisfy the condition $RGB_{product}$>$threshold_{near\text{-}white}$, where the value of the threshold is (a*$RGB_{avg\_prod}$+b*variance). Using variance as a factor in determining the $threshold_{near\text{-}white}$ value needed for a pixel to be considered a near-white pixel allows the $threshold_{near\text{-}white}$ value to change based on a statistical nature of the acquired image. In an image with a large number of different colors, i.e. an image with a high variance, the presence of a color with a particular hue is more likely to be a correct representation of the object being photographed than a distortion caused by the lighting conditions present when the image was acquired. Thus, in an image with a high variance, the $threshold_{near\text{-}white}$ value for including a pixel in the set of near-white pixels is higher.

Excluding Saturated Pixels

In one embodiment, pixels with an R, G, or B value that is greater than a $threshold_{saturated}$ value, such as when R, G, or B is equal to or greater than 250, are considered saturated and are excluded from the set of near-white pixels. Saturated pixels are excluded from the near-white pixel set because a subpixel value above that $threshold_{saturated}$ value often contains skewed color information. For example, in an image with a very bright red light, the image sensor acquiring the image might not be able to accurately detect the intensity of the red component. As a result, a red subpixel of a pixel might have a value of close to 255, but if not for the limitations of the hardware acquiring the image, the value of the red subpixel would be higher. In such an instance, the image data acquired by the image sensor may not accurately reflect the ratio of the R, G, and B values present. Therefore, these pixels are excluded from the set of near-white pixels.

Near-White Threshold Value Coefficients

When (a*$RGB_{avg\_prod}$+b*variance) is used to determine the $threshold_{near\text{-}white}$ value, the a-coefficient and b-coefficient can be determined based on system design preferences. The a-coefficient adjusts how sensitive the white-balance operation is to images that are dominated by a single color. An image dominated by a single color will have a low variance, and most pixels will have an $RGB_{product}$ close to $RGB_{avg\_prod}$. An a-value greater than 1 ensures that only pixels with an $RGB_{product}$ greater than $RGB_{avg\_prod}$ will be included in the set of near-white pixels. In images dominated by one color, difficulties exist in determining whether a hue is an accurate representation of the object in the image or a distortion. Thus, an a-value of greater than 1 can be used to cause the white-balance operation to not adjust the pixel values in such situations, under the assumption that it is preferable to not adjust an image rather than to apply an incorrect adjustment to an image.

The b-coefficient determines the white-balance operation's sensitivity. For example, a large b-value decreases the number of pixels that will be included in the set of near-white pixels by increasing the $threshold_{near\text{-}white}$ value an $RGB_{product}$ must exceed to be included in the set of near-white pixels. In a system with a 24-bit image acquisition sensor, the a-coefficient might equal 1.2, and the b-coefficient might equal 2.5. When implementing the techniques described herein with image sensors of other bit-depths, the values of the a-coefficient and b-coefficient might be different.

Gain Factors

An average of the R values ($R_{avg}$), an average of the G values ($G_{avg}$), and an average of the B values ($B_{avg}$) for the pixels in the set of near-white pixels can be calculated. Based on $R_{avg}$, $G_{avg}$, and $B_{avg}$, gain factors can be determined (block 240), where $G_R$ represents a gain to be applied to red subpixels, $G_G$ represents a gain to be applied to green subpixels, and $G_B$ represents a gain to be applied to blue subpixels. According to one embodiment, the gain factors are determined to make $R_{avg}$, $G_{avg}$, and $B_{avg}$ equal. In such an embodiment, the gain factors can be determined for each of $R_{avg}$, $G_{avg}$, and $B_{avg}$ based on the following equations:

$$G_R*R_{avg}=(R_{avg}+G_{avg}+B_{avg})/3;$$

$$G_G*G_{avg}=(R_{avg}+G_{avg}+B_{avg})/3;$$

$$G_B*B_{avg}=(R_{avg}+G_{avg}+B_{avg})/3.$$

Determining gain factors to make $R_{avg}$, $G_{avg}$, and $B_{avg}$ equal to ($R_{avg}$+$G_{avg}$+$B_{avg}$)/3 is but one of many contemplated embodiments. Gain factors can also be determined based on lowering the two highest of the $R_{avg}$, $G_{avg}$, and $B_{avg}$ to be equal to the lowest of the three, based on raising the two lowest of $R_{avg}$, $G_{avg}$, and $B_{avg}$ to equal to the highest of the three values, or by numerous other techniques.

Adjusting Based on Gain Factors

The determined value for $G_R$ can be used to adjust the R value of each pixel in the stored image; the determined value for $G_G$ can be used to adjust the G value of each pixel in the stored image; and the determined value for $G_B$ can be used to adjust the B value of each pixel in the stored image (block 250). In some embodiments, $G_R$, $G_G$, and $G_B$ might be used to adjust fewer than all the pixels in the image, such as only the set of near-white pixels identified in block 230 of FIG. 2. Typically, all pixels in an image will have the same undesirable hue, but the hue is more noticeable in white and near-white pixels than in pixels of other colors.

Multi-Frame White Balancing

In one embodiment, the first, second, and third frames are separate frames that are acquired in a pre-capture movie mode. For example, when the user presses a button to take a picture, a digital camera might continuously acquire images at a rate of 2 to 16 frames per second, as if the camera were recording a movie. However, rather than store each of the frames, the camera may only store a single image. In such an embodiment, $RGB_{avg\_prod}$ and variance values can be determined from two separate frames acquired in the pre-capture mode, and the third frame can be the frame of the stored image. Assuming the camera acquires the frames at a sufficiently high rate, such as a few frames per second or higher, variations in the three frames will be minimal and not degrade the performance of the techniques described herein. In one embodiment, the techniques described herein can be implemented in real-time logic. When implementing the techniques described herein in real time logic, the RGB $avg\_prod$ value and variance value can be determined based on the first and second frames, respectively, without the first and second frames ever being saved to a permanent memory.

Single-Frame White Balancing

In one embodiment, the techniques of the present invention can be implemented based on a single frame. For example, when the techniques are implemented in software that is executed after an image has been capture, the processing need not be performed in real-time. Consequently, the first, second, and third frames do not need to be separate frames but can be separate frames. In some embodiments, the first, second, and third frames described herein will be the same frame.

Near-Gray Pixels

In some embodiments, near-gray pixels can be used as the basis for white balancing operation, instead of or in addition to near-white pixels. Near-gray pixels can be identified by finding the pixels for the highest $RGB_{product}$ that correspond to a specific sum of RGB values ($RGB_{sum}$). For example, a first pixel with R, G, and B values of 100, 25, and 75 and a second pixel with R, G, and B values of 66, 68, and 66 will both have $RGB_{sum}$ values of 200, but the first pixel will have an $RGB_{product}$ of 187,500 while the second pixel will have an $RGB_{product}$ of 296,208. The high $RGB_{product}$ of the second pixel can indicate that the second pixel is a near-gray pixel. The highest $RGB_{product}$ for a particular $RGB_{sum}$ occurs when R, G, and B values are equal. Thus, the $RGB_{product}$ can be used to identify near-gray pixels that can be included in the subset of pixels use to calculate gain factors for the white-balancing operation, in addition to or instead of near-white pixels.

Example Mobile Device

Figure 3:
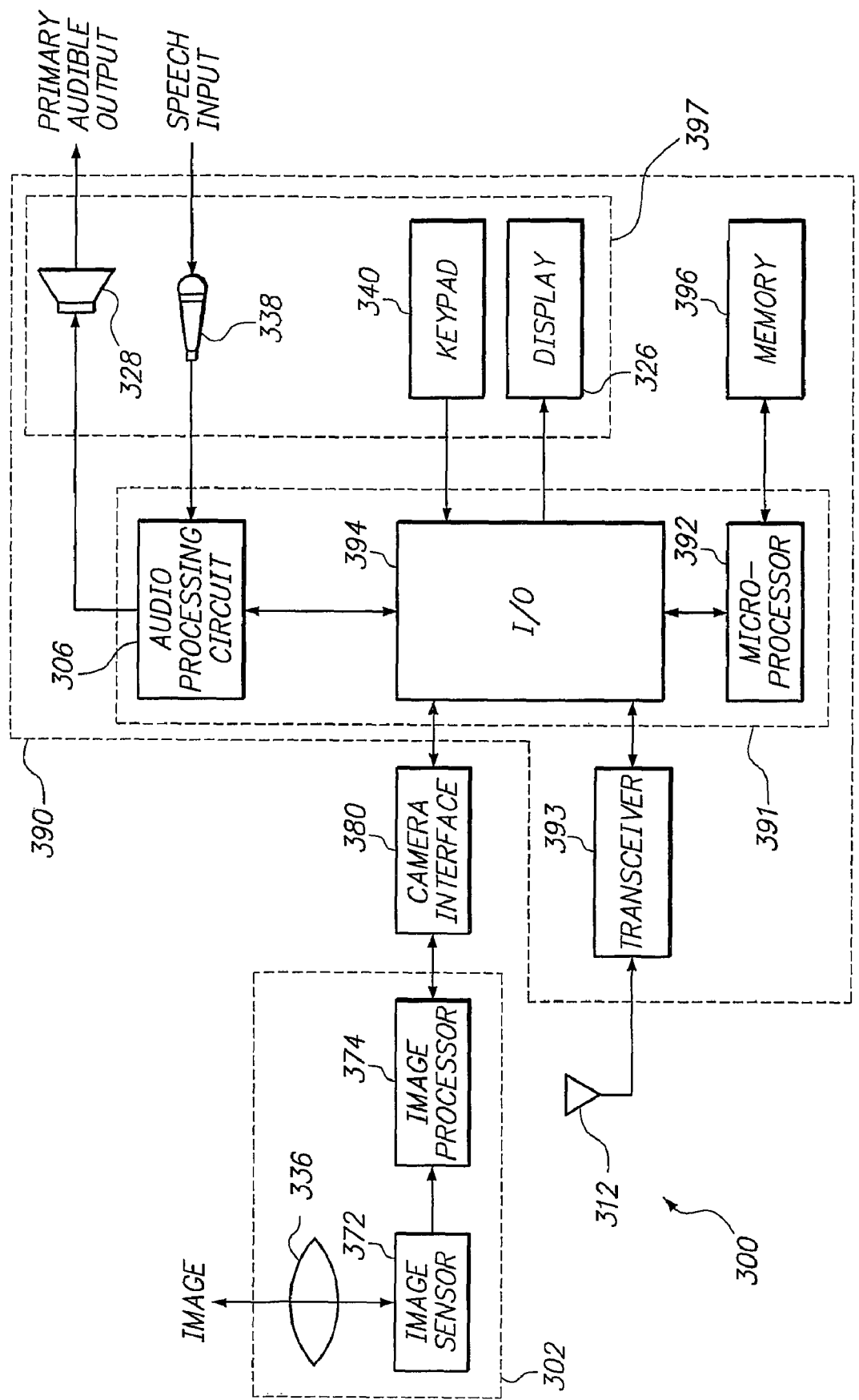
FIG. 3 is a block diagram for an example mobile device in which embodiments of the present invention may be implemented.

FIG. 3 illustrates a block diagram for an example mobile device 300 in which embodiments of the present invention may be implemented. Mobile device 300 comprises a camera assembly 302, camera and graphics interface 380, and a communication circuit 390. Camera assembly 370 includes camera lens 336, image sensor 372, and image processor 374. Camera lens 336, comprising a single lens or a plurality of lenses, collects and focuses light onto image sensor 372. Image sensor 372 captures images formed by light collected and focused by camera lens 336. Image sensor 372 may be any conventional image sensor 372, such as a charge-coupled device (CCD) or a complementary metal oxide semiconductor (CMOS) image sensor. Image processor 374 processes raw image data captured by image sensor 372 for subsequent storage in memory 396, output to a display 326, and/or for transmission by communication circuit 390. The image processor 374 may be a conventional digital signal processor programmed to process image data, which is well known in the art.

Image processor 374 interfaces with communication circuit 390 via camera and graphics interface 380. Communication circuit 390 comprises antenna 312, transceiver 393, memory 396, microprocessor 392, input/output circuit 394, audio processing circuit 306, and user interface 397. Transceiver 393 is coupled to antenna 312 for receiving and transmitting signals. Transceiver 393 is a fully functional cellular radio transceiver, which may operate according to any known standard, including the standards known generally as the Global System for Mobile Communications (GSM), TIA/EIA-36, cdmaOne, cdma2000, UMTS, and Wideband CDMA.

The image processor 374 may process images acquired by the sensor 372 using one or more embodiments described herein. The image processor 374 can be implemented in hardware, software, or some combination of software and hardware. For example, the image processor 374 could be implemented as part of an application specific integrated circuit (ASIC). As another example, the image processor 374 may be capable of accessing instructions that are stored on a computer readable medium and executing those instructions on a processor, in order to implement one or more embodiments of the present invention.

Microprocessor 392 controls the operation of mobile device 300, including transceiver 393, according to programs stored in memory 396. Microprocessor 392 may further execute portions or the entirety of the image processing embodiments disclosed herein. Processing functions may be implemented in a single microprocessor, or in multiple microprocessors. Suitable microprocessors may include, for example, both general purpose and special purpose microprocessors and digital signal processors. Memory 396 represents the entire hierarchy of memory in a mobile communication device, and may include both random access memory (RAM) and read-only memory (ROM). Computer program instructions and data required for operation are stored in non-volatile memory, such as EPROM, EEPROM, and/or flash memory, which may be implemented as discrete devices, stacked devices, or integrated with microprocessor 392.

Input/output circuit 394 interfaces microprocessor 392 with image processor 374 of camera assembly 370 via camera and graphics interface 380. Camera and graphics interface 380 may also interface image processor 374 with user interface 397 according to any method known in the art. In addition, input/output circuit 394 interfaces microprocessor 392, transceiver 393, audio processing circuit 306, and user interface 397 of communication circuit 390. User interface 397 includes a display 326, speaker 328, microphone 338, and keypad 340. Display 326, disposed on the back of display section, allows the operator to see dialed digits, images, called status, menu options, and other service information.

Keypad 340 includes an alphanumeric keypad and may optionally include a navigation control, such as joystick control (not shown) as is well known in the art. Further, keypad 340 may comprise a full QWERTY keyboard, such as those used with palmtop computers or smart phones. Keypad 340 allows the operator to dial numbers, enter commands, and select options.

Microphone 338 converts the user's speech into electrical audio signals. Audio processing circuit 306 accepts the analog audio inputs from microphone 338, processes these signals, and provides the processed signals to transceiver 393 via input/output 394. Audio signals received by transceiver 393 are processed by audio processing circuit 306. The basic analog output signals produced by processed audio processing circuit 306 are provided to speaker 328. Speaker 328 then converts the analog audio signals into audible signals that can be heard by the user.

Those skilled in the art will appreciate that one or more elements shown in FIG. 3 may be combined. For example, while the camera and graphics interface 380 is shown as a separated component in FIG. 3, it will be understood that camera and graphics interface 380 may be incorporated with input/output circuit 394. Further, microprocessor 392, input/output circuit 394, audio processing circuit 306, image processor 374, and/or memory 396 may be incorporated into a specially designed application-specific integrated circuit (ASIC) 391.

Example Computer System

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
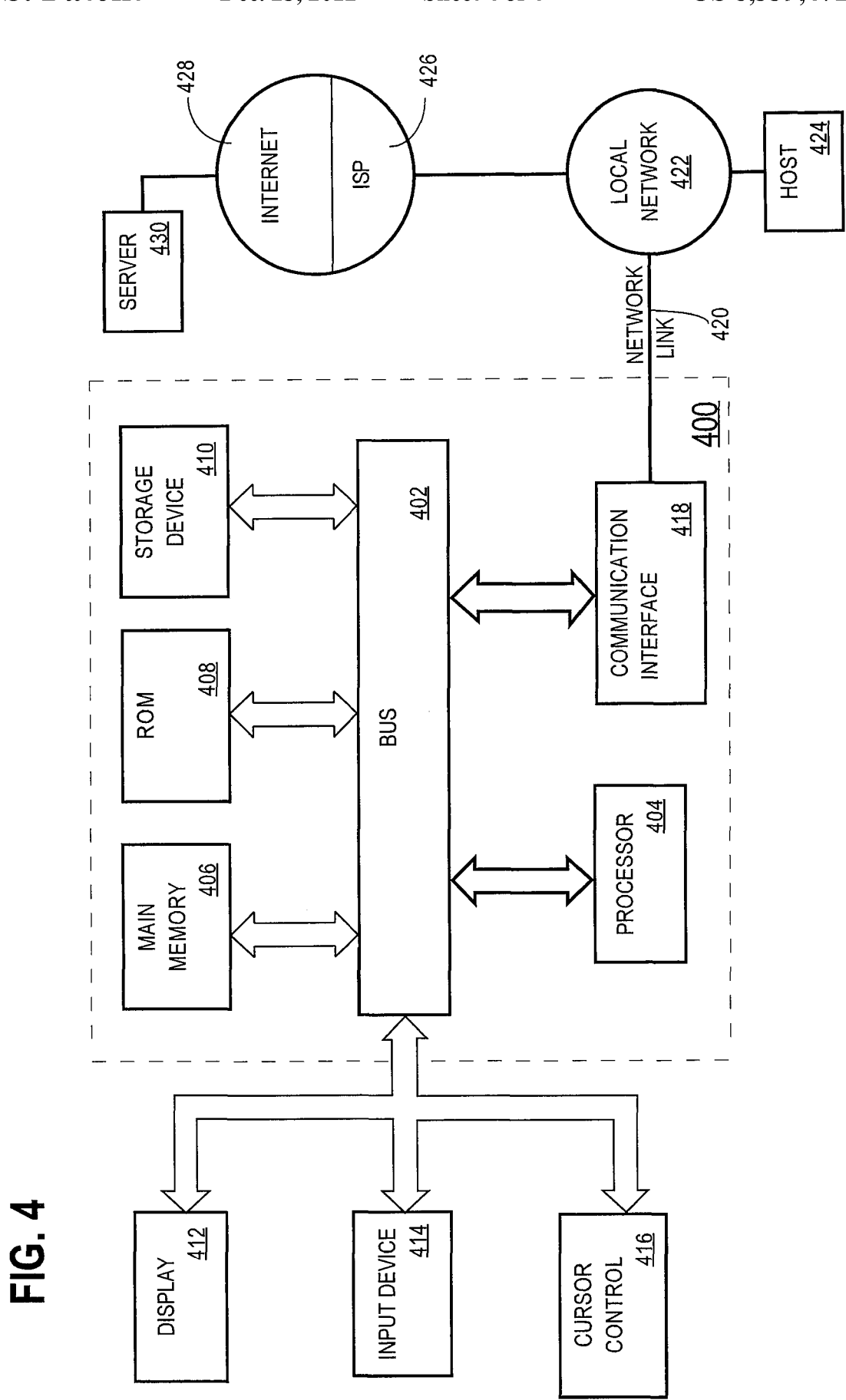
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    for a pixel in a digital image, calculating a product of a red component value of the pixel, a green component value of the pixel, and a blue component value of the pixel, wherein the product comprises the pixel's red value (R) multiplied by the pixel's green value (G) multiplied by the pixel's blue value (B);
    in response to the product satisfying a condition, determining that the pixel belongs to a particular set of pixels;
    determining a gain factor based on red component values of only those pixels that belong the particular set of pixels, green component values of only those pixels that belong to the particular set of pixels, and blue component values of only those pixels that belong to the particular set of pixels;
    based at least in part on the gain factor, adjusting at least one of the red component value of the pixel, the green component value of the pixel, and the blue component value of the pixel;
    wherein the method is performed by a special purpose computing device.

2. The method of claim 1 wherein:
    the condition is that the product is greater than a threshold value; and
    the particular set of pixels is a set that includes near-white pixels.

3. One or more non-transitory storage media storing instructions which, when executed by one or more computing devices, cause performance of the method recited in claim 2.

4. The method of claim 1, wherein determining the gain factor comprises normalizing an average red component value for the particular set of pixels, an average green component value for the particular set of pixels, and an average blue component value for the particular set of pixels.

5. One or more non-transitory storage media storing instructions which, when executed by one or more computing devices, cause performance of the method recited in claim 4.

6. One or more non-transitory storage media storing instructions which, when executed by one or more computing devices, cause performance of the method recited in claim 1.

7. A method comprising:
    for a pixel in a digital image, calculating a product of a red component value of the pixel, a green component value of the pixel, and a blue component value of the pixel;
    in response to the product satisfying a condition, determining that the pixel belongs to a particular set of pixels;
    determining a gain factor based on red component values of only those pixels that belong the particular set of pixels, green component values of only those pixels that belong to the particular set of pixels, and blue component values of only those pixels that belong to the particular set of pixels;
    based at least in part on the gain factor, adjusting at least one of the red component value of the pixel, the green component value of the pixel, and the blue component value of the pixel;
    wherein the method is performed by a special purpose computing device:
    the condition is that the product is at least as high as the product for any other pixel in the image whose subpixels sum to a particular value; and
    the particular set of pixels is a set that includes near-gray pixels.

8. One or more non-transitory storage media storing instructions which, when executed by one or more computing devices, cause performance of the method recited in claim 7.

9. A method comprising:
    for a pixel in a digital image, calculating a product of a red component value of the pixel, a green component value of the pixel, and a blue component value of the pixel;
    in response to the product satisfying a condition, determining that the pixel belongs to a particular set of pixels;
    determining a gain factor based on red component values of only those pixels that belong the particular set of pixels, green component values of only those pixels that belong to the particular set of pixels, and blue component values of only those pixels that belong to the particular set of pixels;

based at least in part on the gain factor, adjusting at least one of the red component value of the pixel, the green component value of the pixel, and the blue component value of the pixel;

wherein the method is performed by a special purpose computing device, and wherein:

the condition is that the product is greater than a threshold value; and the particular set of pixels is a set that includes near-white pixels, wherein the threshold value is based at least in part on an average RGB product for a plurality of pixels, each pixel in the plurality having an RGB product.

10. The method of claim 9, wherein the threshold value is based at least in part on a variance value, the variance value determined based at least in part on the average RGB product.

11. The method of claim 10, wherein the average RGB product is determined based on pixel values in a first frame, and the variance is based on pixel values in a second frame that is different than the first frame.

12. The method of claim 11, wherein the digital image is a third frame.

13. One or more non-transitory storage media storing instructions which, when executed by one or more computing devices, cause performance of the method recited in claim 12.

14. One or more non-transitory storage media storing instructions which, when executed by one or more computing devices, cause performance of the method recited in claim 11.

15. One or more non-transitory storage media storing instructions which, when executed by one or more computing devices, cause performance of the method recited in claim 10.

16. One or more non-transitory storage media storing instructions which, when executed by one or more computing devices, cause performance of the method recited in claim 9.

17. A method comprising:

for a pixel in a digital image, calculating a product of a red component value of the pixel, a green component value of the pixel, and a blue component value of the pixel;

in response to the product satisfying a condition, determining that the pixel belongs to a particular set of pixels;

determining a gain factor based on red component values of only those pixels that belong the particular set of pixels, green component values of only those pixels that belong to the particular set of pixels, and blue component values of only those pixels that belong to the particular set of pixels;

based at least in part on the gain factor, adjusting at least one of the red component value of the pixel, the green component value of the pixel, and the blue component value of the pixel;

wherein the method is performed by a special purpose computing device, and wherein:

the condition is that the product is greater than a threshold value; and the particular set of pixels is a set that includes near-white pixels, wherein the method further comprises:

excluding from the particular set one or more pixels that have a red component value, a green component value, or a blue component value greater than a second threshold value.

18. One or more non-transitory storage media storing instructions which, when executed by one or more computing devices, cause performance of the method recited in claim 17.

19. A digital image acquisition device comprising:

logic that is operable to:

for a pixel in a digital image, calculate a product of a red component value of the pixel, a green component value of the pixel, and a blue component value of the pixel, wherein the product comprises the pixel's red value (R) multiplied by the pixel's green value (G) multiplied by the pixel's blue value (B);

in response to the product being greater than a threshold value, determine that the pixel belongs to a set of near-white pixels;

determine a gain factor based on red component values of the set, green component values of the set, and blue component values of the set;

based at least in part on the gain factor, adjust at least one of the red component value of the pixel, the green component value of the pixel, and the blue component value of the pixel.

20. The digital image acquisition device of claim 19, wherein the gain factor is determined based at least in part on normalizing an average red component value for the set of near-white pixels, an average green component value for the set of near-white pixels, and an average blue component value for the set of near-white pixels.

21. A digital image acquisition device comprising:

logic that is operable to:

for a pixel in a digital image, calculate a product of a red component value of the pixel, a green component value of the pixel, and a blue component value of the pixel;

in response to the product being greater than a threshold value, determine that the pixel belongs to a set of near-white pixels;

determine a gain factor based on red component values of the set, green component values of the set, and blue component values of the set;

based at least in part on the gain factor, adjust at least one of the red component value of the pixel, the green component value of the pixel, and the blue component value of the pixel, wherein the threshold value is based at least in part on an average RGB product for a plurality of pixels, each pixel in the plurality having an RGB product.

22. The digital image acquisition device of claim 21, wherein the threshold value is based at least in part on a variance value, the variance value determined based at least in part on the average RGB product.

23. A digital image acquisition device comprising:

logic that is operable to:

for a pixel in a digital image, calculate a product of a red component value of the pixel, a green component value of the pixel, and a blue component value of the pixel;

in response to the product being greater than a threshold value, determine that the pixel belongs to a set of near-white pixels;

determine a gain factor based on red component values of the set, green component values of the set, and blue component values of the set;

based at least in part on the gain factor, adjust at least one of the red component value of the pixel, the green component value of the pixel, and the blue component value of the pixel, wherein the average RGB product is determined based on pixel values in a first frame, and the variance is based on pixel values in a second frame that is different than the first frame.

24. The digital image acquisition device of 23, wherein the digital image is a third frame.

25. A digital image acquisition device comprising:
logic that is operable to:
for a pixel in a digital image, calculate a product of a red component value of the pixel, a green component value of the pixel, and a blue component value of the pixel;
in response to the product being greater than a threshold value, determine that the pixel belongs to a set of near-white pixels;
determine a gain factor based on red component values of the set, green component values of the set, and blue component values of the set;
based at least in part on the gain factor, adjust at least one of the red component value of the pixel, the green component value of the pixel, and the blue component value of the pixel; and
exclude from the set one or more pixels that have a red component value, green component value, or blue component value greater than a second threshold value.

* * * * *